United States Patent [19]

Nagao et al.

[11] Patent Number: 4,717,592
[45] Date of Patent: Jan. 5, 1988

[54] VERTICAL MAGNETIZATION TYPE RECORDING MEDIUM AND MANUFACTURING METHOD THEREFOR

[75] Inventors: Makoto Nagao; Fusao Yamanaka; Kunihiko Sano; Akira Nahara, all of Kanagawa, Japan

[73] Assignee: Fuji Photo Film Co., Ltd., Kanagawa, Japan

[21] Appl. No.: 809,828

[22] Filed: Dec. 17, 1985

[30] Foreign Application Priority Data

Dec. 24, 1984 [JP] Japan ............... 59-270649
Dec. 26, 1984 [JP] Japan ............... 59-273365
Dec. 26, 1984 [JP] Japan ............... 59-273366

[51] Int. Cl.$^4$ .................. B05D 5/00; B05D 5/12
[52] U.S. Cl. ...................... 427/128; 427/131; 427/132; 427/209; 427/404; 428/694; 428/900; 428/928
[58] Field of Search ............ 428/611, 216, 637, 686, 428/694, 900, 928; 427/50, 128, 131, 132, 209, 296, 404

[56] References Cited

U.S. PATENT DOCUMENTS

| | | | |
|---|---|---|---|
| 3,832,168 | 8/1974 | Gulla | 428/680 |
| 4,103,315 | 7/1978 | Hempstead et al. | 427/131 |
| 4,210,946 | 7/1980 | Iwasaki et al. | 428/900 |
| 4,224,381 | 9/1980 | Patel et al. | 427/131 |
| 4,277,809 | 7/1981 | Fisher et al. | 428/900 |
| 4,410,583 | 10/1983 | Hanaska | 427/131 |
| 4,544,591 | 10/1985 | Uesaka et al. | 428/216 |
| 4,576,876 | 3/1986 | Shiiki et al. | 427/131 |
| 4,621,030 | 11/1986 | Uesaka et al. | 428/611 |

FOREIGN PATENT DOCUMENTS 2230 1/1984 Japan.
83218 5/1985 Japan.
191424 9/1985 Japan.
229220 11/1985 Japan.

Primary Examiner—George F. Lesmes
Assistant Examiner—William M. Atkinson
Attorney, Agent, or Firm—Sughrue, Mion, Zinn, Macpeak & Seas

[57] ABSTRACT

In forming a vertical magnetization type recording medium, a first soft magnetic film layer is formed on each side of a film-shaped support by vacuum deposition or sputtering at a temperature of 30° C. or lower, a second soft magnetic film layer is formed on each of the first soft magnetic film layers, and a vertical magnetization film layer essentially containing Co-Cr is formed on each of the second soft magnetic film layers. The thickness of the first soft magnetic film layer on one side of the support may be made different from that of the first soft magnetic film layer on the other side so that curling of the recording medium is substantially eliminated.

11 Claims, 6 Drawing Figures

MODULATION $= V_{max} - V_{min} / V_{max} + V_{min}$

FIG. 4

VERTICAL MAGNETIZATION TYPE RECORDING MEDIUM AND MANUFACTURING METHOD THEREFOR

BACKGROUND OF THE INVENTION

The present invention relates to vertical magnetization type recording media and methods for manufacturing such media. More particularly, the invention relates to a vertical magnetization type recording medium of a type having a support with a soft magnetic film layer and a vertical magnetization film layer formed on each side of the support, and to a method of manufacturing such a recording medium.

Recently, a vertical magnetization type recording system has been proposed which uses a magnetic recording medium having an "easy" magnetizing axis perpendicular to its film surface. In the vertical magnetization recording system, as the recording density increases, the diamagnetic field in the recording medium is reduced, and therefore an excellent reproduction output is provided. Thus, the system is fundamentally suitable for high-density recording.

In order to perform a magnetic recording operation using the vertical magnetization type recording system, it is necessary to employ a magnetic recording medium having an easy magnetizing axis perpendicular to the film surface. An example of a suitable vertical magnetization type recording medium is one provided by forming a Co-Cr film layer on a support of macromolecular material or non-magnetic material such as a non-magnetic metal by sputtering or the like.

For improving the recording and reproducing efficiency for vertical magnetization type recording and reproducing, a so-called "two-film-layer vertical magnetization type recording medium" has been proposed in which a high-magnetic-permeability layer of soft magnetic material such as a permalloy (Ni-Fe alloy) film layer is formed, as a base layer, under the vertical magnetization type recording layer, namely, the aforementioned Co-Cr film layer.

For a flexible disk according to the aforementioned vertical magnetization type recording system, a so-called two-layer vertical-magnetization type recording medium, on both sides of which the two-layer vertical magnetization type recording layer is formed, is suitable because it provides a large recording capacity and curling is not a problem.

Figure 1:
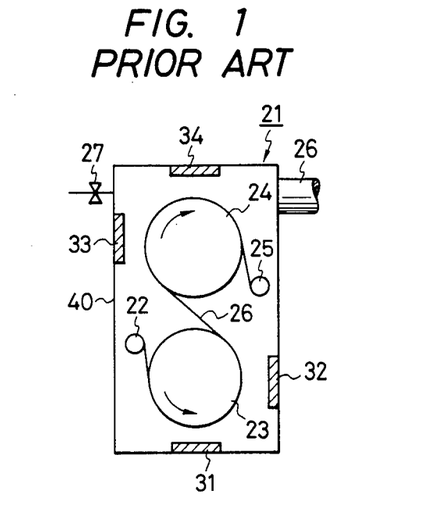
FIG. 1 is an explanatory diagram showing a sputtering apparatus for manufacturing a conventional vertical magnetization type recording medium.

Heretofore, the above-described double-sided two-layer vertical magnetization type recording medium has been manufactured using a continuously running film-shaped support with a double-sided sputtering apparatus as shown in FIG. 1.

A method is known in which a two-film layer is formed on each side of the film-shaped support with the apparatus shown in FIG. 1 while the support is run in only one direction.

The apparatus has a sputtering chamber 40 in which cylindrical cans 23 and 24 are arranged. After the sputtering chamber is evacuated, argon gas is introduced thereinto in an amount so that the pressure in the chamber is maintained at about $3 \times 10^{-3}$ torr. A PET film is supplied from a supply shaft 22 in the chamber 40. At the can 23, a permalloy film layer is formed on one side of the PET film thus supplied by sputtering using a permalloy sputtering source 31, and a Co-Cr vertical magnetization film layer is formed on the permalloy film layer thus formed using a Co-Cr sputtering source 32. In succession, at the can 24, a permalloy film layer is formed on the other side of the PET film using a permalloy sputtering source 33, and a Co-Cr vertical magnetization film layer is formed on the permalloy film layer using a Co-Cr sputtering source 33. The PET film is wound on a take-up shaft 25 after being treated as described above. That is, in this method, a two-film layer is formed on one side of a film-shaped support by sputtering using the permalloy target 31 and the Co-Cr target 32, and then another two-film layer is formed on the other side with using the permalloy target 33 and the Co-Cr target 34.

In the case where a double-sided two-layer vertical magnetization type recording medium having Co-Cr film layers of high coercive force $H_c$ (vertical) in a vertical direction is formed employing a high-speed sputtering method such as a DC magnetron sputtering method, it is generally desirable that the temperature of the support be high during the sputter deposition of the Co-Cr film layer.

However, in the double-sided two-layer vertical magnetization type recording medium manufactured using a film-shaped support of macromolecular material as described above, when the support is heated, the surface characteristics of the support tend to be deteriorated, the vertical orientation of the vertical magnetization film layer disturbed, and both sides of the recording medium tend to have different surface characteristics, vertical orientation and $H_c$ (vertical), with the result that the recording and reproducing characteristics are poorer than desired. Thus, the conventional process involves serious problems in the mass production of the recording medium.

In the case where the double-sided two-layer vertical magnetization type recording medium is formed using the winding type continuous sputtering apparatus shown in FIG. 1, in general, tension is applied in one direction to the film-shaped support. As a result, the static magnetic characteristics of the soft magnetic film layer tend to be anisotropic; that is, the film layer tends to become magnetically anisotropic, and the static magnetic characteristics, for instance, the magnetic permeability, tend to vary in different directions. Therefore, when a recording and reproducing operation is carried out with a floppy disk formed by stamping (cutting) such a recording medium, the reproduction output often varies in the circumferential direction.

Intensive research has been carried out by the present inventors to overcome the above-described difficulties, and it was found that the static magnetic characteristic of the soft magnetic film layer can be made substantially isotropic by heating the cylindrical can to 30° C. to 90° C. during the sputtering of the soft magnetic film layer.

In addition, it was found that if both sides of the film-shaped support are covered with a soft magnetic film layer before the vertical magnetization film layer, such as a Co-Cr film layer, is formed thereon, the discharge of impurity gas and the deposition of oligomer from the film-shaped support of macromolecular material or the like is suppressed. Therefore, it becomes possible to heat the cylindrical cans to 90° C. or higher in forming the Co-Cr film layers by sputtering, thereby to form a double-sided two-layer vertical magnetization type recording medium which has vertical magnetization film layers of high coercive force $H_c$ (vertical) and excellent vertical orientation and of which the two sides have uniform characteristics.

According to this method, a double-sided two-layer vertical magnetization type recording medium is obtained which has less reproduction output variation in the circumferential direction than the conventionally produced medium, and which has excellent vertical magnetization characteristics. However, it has been found that the recording medium is still disadvantageous in that the soft magnetic film layer on each side of the recording medium and the vertical magnetization film layer formed on the soft magnetic film layer have relatively poor surface characteristics; that is, the surfaces of these film layers are relatively rough. Furthermore, the characteristics of the soft magnetic film layer formed on the side of the film-shaped support tend to be somewhat different from those of the soft magnetic film layer formed on the other side.

Moreover, probably because of the use of the cylindrical cans, in the recording medium manufactured according to the conventional method, the magnetic film and the film-shaped support are strained in different manners. As a result, the recording medium generally curled a great deal. A strongly curled recording medium is not practical in use.

On the other hand, a vertical magnetization type recording medium which scarcely curls has been proposed in Japanese Patent Application Publication No. 2230/1984. This recording medium is a double-sided single-layer vertical magnetization type recording medium in which curl balance is effected by adjusting the thicknesses of the vertical magnetization film layers formed on the two sides of the film-shaped support.

However, this conventional vertical magnetization type recording medium is disadvantageous in that its two sides do not have the same electromagnetic conversion characteristics. For instance, if the vertical magnetization film layer on one side of the recording medium has a greater thickness than that of the other side, the one side provides a greater low-frequency reproduction output than the other side. Furthermore, the double-sided single-layer vertical magnetization type recording medium provides a lower reproduction output than the double-sided plural-layer vertical magnetization type recording medium.

Accordingly, the inventors have conducted intensive research to find a double-sided plural-layer vertical magnetization type recording medium which scarcely curls and which can provide substantially-equal high-level reproduction outputs from both its sides.

In an attempt to do this, the inventors have tried recording media in which the magnetization film on one side of a double-sided plural-layer vertical magnetization type recording medium is made different from that of the vertical magnetization film on the other side. It was found that the recording media scarcely curled, but the reproduction output from the two sides thereof differed greatly.

In addition, it has been found that, if the thickness of the soft magnetic film layer on one side of the recording medium is made different from that of the soft magnetic film layer on the other side, the recording medium scarcely curls and the reproduction outputs of both sides are substantially equal. However, the reproduction characteristics of the recording media tend to differ greatly among lots, and if the thickness differs from the optimum value even slightly, the recording medium has a strong tendency to curl; that is, the manufacture of the recording medium requires severe manufacturing tolerances. Moreover, in order to obtain a satisfactory curl balance, it is necessary to provide a relatively large difference in thickness between the two soft magnetic film layers, which makes the two sides of the recording medium have different durabilities.

SUMMARY OF THE INVENTION

The inventors have conducted research regarding the reasons why the above difficulties still accompany the improved process for producing recording media and have found that, in forming the soft magnetic film layer on each side of the support at 30° C. to 90° C., because the support is held at a relatively high temperature, gas is discharged from the support, thus adversely affecting the surface characteristics, etc., of the soft magnetic film layers.

Accordingly, an object of the present invention is to provide a double-sided two-layer vertical magnetization type recording medium in which the above-described difficulties accompanying the conventional double-sided two-layer vertical magnetization type recording medium and the double-sided two-layer vertical magnetization type recording medium proposed by the present inventor have been eliminated, and also a method of manufacturing this recording medium.

More specifically, an object of the invention is to provide a double-side two-layer vertical magnetization type recording medium which suffers less variation in its reproduction output in the circumferential direction, and a method of manufacturing this recording medium.

Another object of the invention is to provide a double-sided two-layer vertical magnetization type recording medium having soft magnetic film layers formed on both sides of a support by sputtering or vacuum deposition, which film layers have uniform characteristics and especially excellent vertical magnetization characteristics, and a method of manufacturing this recording medium.

A still further object of the invention is to provide a double-sided plural-layer vertical magnetization type recording medium which scarcely curls, for which the reproduction output levels from its two sides are substantially equal, the durability of the two sides is the same, and for which the manufacturing tolerances are relatively large. It is also an object of the invention to provide a method of manufacturing such a double-sided plural-layer vertical magnetization type recording media.

The foregoing objects and other objects of the invention have been achieved by the provision of a vertical magnetization type recording medium comprising a film-shaped support, a soft magnetic film layer formed on each side of the support, and a vertical magnetization film layer essentially containing Co and Cr formed on each soft magnetic film, in which, according to the invention, each soft magnetic film layer is made up of a first soft magnetic film layer formed on each side of the support, and a second soft magnetic film layer formed on each first magnetic film layer, the first soft magnetic film layers being formed by vacuum deposition or sputtering at a temperature of 30° C. or lower, and the second soft magnetic film layers being formed by vacuum deposition or sputtering at a temperature of 60° C. or higher.

The invention can also be practiced by the provision of a vertical magnetization type recording medium manufacturing method in which a soft magnetic film layer and a vertical magnetization film layer essentially containing Co-Cr are formed by vacuum depositing or sputtering on each side of a film-shaped support while the support is being run along cylindrical cans, in which, according to the invention, first soft magnetic film layers are formed on both sides of the support using soft magnetic film layer vacuum deposition or sputtering sources arranged around cylindrical cans held at a temperature of 30° C. or lower, second soft magnetic film layers are formed on the first soft magnetic film layers using soft magnetic film layer vacuum deposition or sputtering sources held at a temperature of 60° C. or higher, and vertical magnetization film essentially containing Co-Cr are formed on the second soft magnetic layers, or the second soft magnetic film layer and the vertical magnetization film layer are formed on each of the first soft magnetic film layers, by vacuum deposition or sputtering.

The foregoing object and other objects of the invention have further been achieved by the provision of a vertical magnetization type recording medium comprising: a film-shaped support, and a soft magnetic film layer and a vertical magnetization film layer formed on each side of the film-shaped support, in the stated order, by vacuum deposition or sputtering, and in which the soft magnetic film layer is made up of a first soft magnetic film layer formed on each side of the support and a second soft magnetic film layer formed on each first soft magnetic film layer, wherein the thickness of the first soft magnetic film layer is different from that of the first soft magnetic film layer on the other side of the support so that the recording medium scarcely curls.

Still further, the above and other objects have been met by the provision of a method of manufacturing a vertical magnetization type recording medium in which a soft magnetic film layer and a vertical magnetization film layer essentially containing Co-Cr are formed by vacuum deposition or sputtering on each side of a film-shaped support which is run along cylindrical cans, in which each soft magnetic film layer is obtained by forming a first soft magnetic film layer on each side of the support and a second soft magnetic film layer on the first soft magnetic film layer by vacuum deposition or sputtering, wherein the thickness of the first soft magnetic film layer on one side of the support is made different from that of the first soft magnetic film layer on the other side of the support so that the recording medium scarcely curls.

The nature, principle and utility of the invention will become more apparent from the following detailed description when read in conjunction with the accompanying drawings.

DESCRIPTION OF THE PREFERRED EMBODIMENTS

In accordance with the invention, firstly, soft magnetic film layers are formed on both sides of a film-shaped support by vacuum deposition or sputtering while the support is held at a temperature of 30° C. or lower so that the two sides of the support are substantially completely covered with the soft magnetic film layers. Secondly, second soft magnetic film layers are formed on the first soft magnetic film layers by vacuum deposition or sputtering while the support is heated to a temperature of 60° C. or higher. Thirdly, vertical magnetization film layers essentially containing Co-Cr are formed on the second soft magnetic film layers by vacuum deposition or sputtering. Alternatively, the second soft magnetic film layer and the vertical magnetization film layer can be formed on each of the first soft magnetic film layers by vacuum deposition or sputtering.

Examples of the material of the film-shaped support used in the invention are macromolecular materials such as polyethyleneterephthalate (PET), polyimide, polyamide, polyphenylene sulfide, polyether sulfone, and polysulfone. The invention is considerably effective on a material such as PET which deposits oligomer, for which the amount of gas discharged increases at about 90° C. to 200° C., and which is readily applicable to a support having a base layer.

It is desirable that the support be subjected to a pretreatment; specifically, it is desirable that it be held in a vacuum, or subjected to heat treatment or glow discharge treatment so as to minimize the amount of gas discharged from the surface and inside the support.

Examples of suitable materials for the soft magnetic film layer are Ni-Fe, Ni-Fe-Mo, Ni-Fe-Mo-Cu, Fe, Fe-Al-Si, Fe-Ni-O, Fe-Ti, Ni-Fe-Cu-Cr-Mn, Fe-Si-B, Fe-B-C, Fe-Al, Co-V-Fe, Co-Ta, Co-Zr, Co-Nb-Zr, Co-Ti, Co-Nb-Ta, Co-Ni-Zr, Fe-Ni-P, Fe-P, and Fe-Co-Zr. That is, any ordinary soft magnetic material can be used.

In order for the first soft magnetic film layer to not be damaged by heat in forming the second soft magnetic film layer and the vertical magnetization film layer by sputtering and for it to have a smooth surface, it is preferable that the first soft magnetic film layer have a large thickness; however, in order for the static magnetic characteristic of the first soft magnetic film layer to be isotropic, it is preferable that the first soft magnetic film layer have a small thickness. Moreover, in order for the second soft magnetic film layer to have a smooth surface, it is preferable that the second soft magnetic film layer have a small thickness, and in order for the static magnetic characteristic of the second magnetic film layer to be isotropic, it is preferable that the second soft magnetic film layer have a large thickness. Further, in order to obtain a satisfactory vertical magnetization type recording and reproducing characteristic, the total thickness of the first and second soft magnetic film layers should be in a certain range.

As a result of experiments conducted by the present inventors, it has been found that the thickness of the second soft magnetic film layer should be 20% to 500% of the thickness of the first soft magnetic film layer, and the total thickness should be 0.1 to 5 microns for best results.

When a soft magnetic film layer is formed with the film-shaped support held at 30° C. or lower, its static magnetic characteristic becomes anisotropic; however, when a soft magnetic film layer is formed with the film-shaped support held at a temperature of 60° C. or higher, its static magnetic characteristic is substantially isotropic.

The present inventors have discovered that, in the case where two soft magnetic film layers are formed on each side of the support, that is, in the case where a first soft magnetic film layer is formed with the support held at 30° C. or lower and a second soft film layer or a second soft film layer and a vertical magnetization film layer are formed on the first soft film layer with the support held at a temperature of 60° C. or higher, the first and second soft magnetic film layers in combination have an isotropic characteristic. The reason for this has not been determined; however, it is considered that this effect is due to the mutual magnetic action of the first and second soft magnetic film layers, or it possibly may be attributed to the fact that the first soft magnetic film layer is strained when the second soft magnetic film layer is formed.

As for the vertical magnetization film layer, it is necessary that its magnetizing easy axis be substantially perpendicular to the surface of the support.

Further, it is desirable that the vertical magnetization film layer be made of an alloy material essentially containing Co and Cr as is well known in the art.

The film layer thickness is of the order of 0.03 to 5 microns, and more preferably 0.05 to 1 micron.

The film layer may be formed by vacuum deposition or sputtering; however, it is desirable to employ a continuous sputtering method in which a plurality of high-speed sputtering sources arranged around a plurality of cylindrical cans are used.

It is desirable that the temperature of the cylindrical cans be set to 30° C. or lower in forming the first soft magnetic film layer because, if the film layer is formed with the cylindrical cans held at higher than 30° C., the film layer's surface becomes rough, being damaged by the heat.

It is necessary that the temperature of the cylindrical cans be set to 60° C. or higher, preferably 90° C. or higher, in forming the second soft magnetic film layer.

On the other hand, in forming the Co-Cr film layer, it is necessary to set the temperature of the cylindrical cans to 90° C. or higher in order to obtain a suitable coercive force $H_c$ (vertical), and it is preferable to set the temperature to 120° C. or higher in order to form a vertical magnetization film layer of very high $H_c$ (vertical).

The double-sided plural-layer vertical magnetization type recording medium according to the invention has soft-magnetic high-magnetic-permeability film layers and vertical magnetization film layers as discussed above. However, it may also include base layers, intermediate layers, and overcoat layers if desired or necessary. Furthermore, it may have a plurality of vertical magnetization film layers on each side.

The invention will be further described with reference to Examples thereof and Comparison Examples.

INVENTIVE EXAMPLE 1

Figure 2:
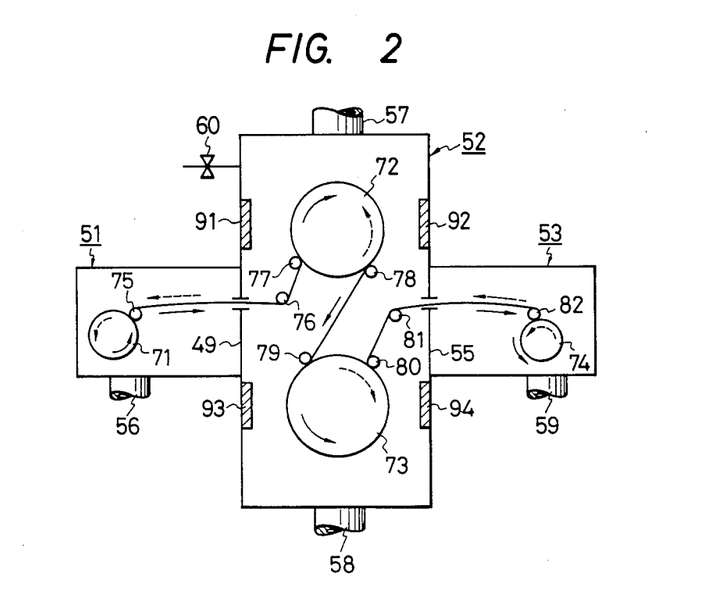
FIG. 2 is an explanatory diagram showing an example of a sputtering apparatus employed in the invention.

A double-sided two-layer vertical magnetization type recording medium was manufactured using a double-sided continuous sputtering apparatus as shown in FIG. 2.

A roll of PET film 50 microns thick was set on a supply shaft 71, and the film was supplied through intermediate rollers 75 through 82 and cylindrical cans 72 and 73 to take-up shaft 74 where it was taken up and wound. The apparatus included a vacuum chamber having a film supplying chamber 51, a sputtering chamber 52, and a film winding chamber 53. The chambers 51 and 53 were separated from the chamber 52 by respective partition walls 54 and 55. These chambers were evacuated with respective air discharging system 56 and 57, and 58 and 59. DC planar magnetron type sputtering cathode 91 and 93 having permalloy targets (Ni 78.5 wt % and Fe 21.5 wt %) and DC planar magnetron type sputtering cathodes 92 and 94 having Co-Cr targets (Co 82 wt % and Cr 18 wt %) were provided in the sputtering chamber.

The sputtering chamber was evacuated to $1 \times 10^{-6}$ torr, and argon gas was introduced through a gas introducing system 60 in an amount so that the pressure in the chamber was held at about $3 \times 10^{-3}$ torr. The PET film was supplied from the supply shaft 71 at a rate of 40 mm/min. At the can 72 held at a predetermined temperature, a permalloy film layer was formed on one side of the PET film (surface 0) to a predetermined thickness using the cathode 91. In succession, at the can 73 held at the same temperature, a permalloy film layer was formed on the other side of the PET film (surface 1) to the same thickness using the sputtering cathode 93. The PET film was wound on the take-up shaft 74 while the first permalloy film layer was being formed on each side of the PET film.

The PET film thus wound was run in the reverse direction from the take-up shaft 74. At the can 73, a second permalloy film layer was formed on the first permalloy film layer of the surface 1 to a predetermined thickness. In succession, at the can 72 held at the same temperature, another second permalloy film layer was formed on the first permalloy film layer on the surface 0 to the same thickness. The PET film was wound on the supply shaft 71.

The PET film, on both sides of which the permalloy film layers were formed as described above, was run in the forward direction again. At the can 72 (held at 120° C.), a Co-Cr film layer about 2700 Å thick was formed on the surface 0 using the sputtering cathode 92. In succession, at the can 73 held at the same temperature, a Co-Cr film layer about 2700 Å thick was formed on the surface 1.

A 5¼" diameter floppy disk was formed by stamping the double-sided triple-layer vertical magnetization type recording medium thus manufactured. The surface conditions of the floppy disk thus formed were observed, and its electromagnetic conversion characteristics were measured.

The can temperatures and the film layer thicknesses employed in the formation of the first and second permalloy film layers, the surface characteristics of the recording medium formed, and one of the electromagnetic conversion characteristics, namely, the modulation characteristic, were are as indicated in rows A and B of Table 1 below. The modulation characteristic is represented by the following expression:

$$\frac{V_{max} - V_{min}}{V_{max} + V_{min}},$$

where $V_{max}$ is the maximum reproduction output level and $V_{min}$ is the minimum reproduction output level.

Figure 3:
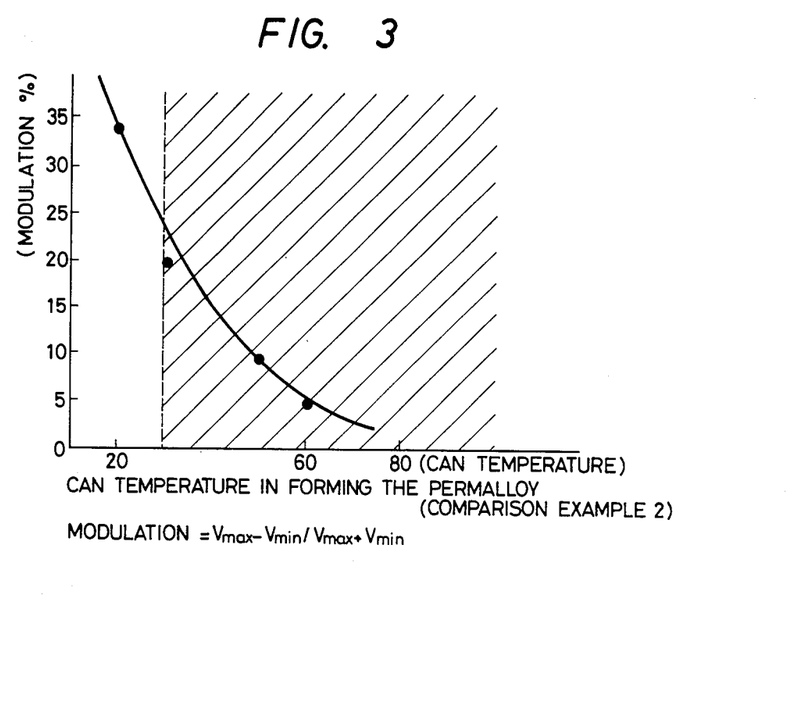
FIG. 3 is a graphical representation indicating the relationships between the can temperatures, modulation characteristics and surface characteristics of double-sided two-layer vertical magnetization type recording media in a comparison example described below.

FIG. 3 demonstrates the fact that, if the number of permalloy film layers on each side of the support is only one, as in the case of Comparison Example 2, in the manufacture of a vertical magnetization type recording medium, there is no range in which a satisfactory modulation characteristic and an excellent surface characteristic are simultaneously attainable.

TABLE 1

| | 1st Layer | | 2nd Layer | | Surface characteristics | Modulation characteristics |
|---|---|---|---|---|---|---|
| | Can Temperature | Thickness | Can temperature | Thickness | | |
| A | 20° C. | 2500 Å | 120° C. | 2300 Å | | 5% |
| B | 30° C. | 2300 Å | 60° C. | 2600 Å | | 5% |
| C | 60° C. | 2500 Å | 100° C. | 2500 Å | X | 4% |
| D | 20° C. | 2500 Å | 40° C. | 2300 Å | | 20% |
| E | 20° C. | 5000 Å | | | X | 33% |
| F | 30° C. | 5500 Å | | | | 20% |
| G | 50° C. | 5000 Å | | | X | 10% |
| H | 60° C. | 6000 Å | | | X | 5% |

A, B: Invention
C to H: Composition Examples

COMPARISON EXAMPLE 1

The apparatus of the above-described Example was employed to form a vertical magnetization type recording medium using a method which was the same as that of the above Inventive Example, except for the can temperatures and film layer thicknesses used in forming the permalloy film layers.

Recording media thus formed were evaluated in the same manner as in Inventive Example 1, and the results of this evaluation are as indicated in rows C and D of Table 1.

COMPARISON EXAMPLE 2

The same apparatus was used to form vertical magnetization type recording media.

The sputtering chamber was evacuated to $1 \times 10^{-6}$ torr, and argon gas was introduced into the sputtering chamber in an amount so that the pressure in the latter was maintained at about $3 \times 10^3$ torr. The PET film was supplied from the supply shaft 71 at a rate of 40 mm/min. At the can 72, a permalloy film layer was formed on one side (surface 0) of the PET film to a thickness of about 5000 Å using the sputtering cathode 91. In succession, at the can 73 held at the same temperature, another permalloy film layer was formed on the other side (surface 1) to the same thickness (about 5000 Å) using the sputtering cathode 93. The PET film thus treated was wound on the take-up shaft 74.

In connection with the above-described operation, the can temperature was set to 20° C., 30° C., 50° C., and 60° C. to form different permalloy film layers.

The PET film covered with the permalloy film layers was run in the opposite direction. At the can 73, a Co-Cr film layer was formed on the other side (surface 1) of the PET film to a thickness of about 2700 Å using the sputtering cathode 94. In succession, at the can 72 held at the same temperature another Co-Cr film layer was formed on the one side (surface 0) to the same thickness (about 2700 Å) using the sputtering cathode 92. The PET film thus treated was wound on the supply shaft 71. The can temperature was set to 120° C.

The double-sided two-layer vertical magnetization type recording media thus formed were evaluated in the same manner as in the above Inventive Example 1. The results of this evaluation are as indicated in columns C through H of Table 1, and in FIG. 3.

On the other hand, in the recording media formed according to the method of the invention, the surface characteristics and the modulation characteristics are both excellent.

In the vertical magnetization type recording media of the Inventive Example 1, when compared with those of the Comparison Example 2, the characteristics of the two sides thereof were substantially the same. Furthermore, the recording media manufactured according to the invention had more uniform characteristics and curled less. About 85% of the recording media had satisfactory recording and reproducing characteristics.

In the above-described Inventive Example 1, the recording media were formed using a two-can type, double-sided sputtering apparatus employing a method in which one film-shaped support is run three times—forwards, backwards and forwards. However, the same recording medium can be manufactured with the same apparatus according to a method in which the film-shaped support is run two times -forwards and backwards, or with a six-can type, double-sided sputtering apparatus by running the film-shaped support once, in one direction only, while forming a permalloy film layer (surface 0), a permalloy film layer (surface 1), a permalloy film layer (surface 0 or 1), a permalloy film layer (surface 1 or 0), a Co-Cr film layer (surface 1 or 0) and a Co-Cr film layer (surface 0 or 1) in the stated order.

In the above-described Example of the invention, two soft magnetic layers were formed on each side of the recording medium. It was found to be of no benefit to increase the number of soft magnetic layers to more than two because the effects were the same as those of the above-described Inventive Example 1. Furthermore, the same results could be obtained by forming the two soft magnetic layers of soft magnetic materials different in composition.

As is apparent from the above description, the vertical magnetization type recording medium according to the invention has very satisfactory surface characteristics and excellent electromagnetic conversion characteristics, with both its sides uniform, and it can be manufactured with a high efficiency.

Figure 4:
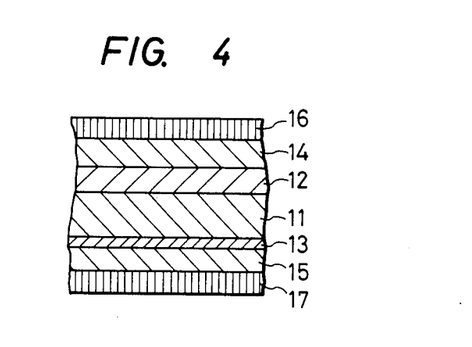
FIG. 4 is an enlarged sectional view showing an example of a vertical magnetization type recording medium according to the invention.

In another example of a double-sided plural-layer vertical magnetization type recording medium according to the invention, as shown in FIG. 4, a first soft magnetic film layer 12, a second soft magnetic film layer 14, and a vertical magnetization film layer 16 are formed on one side of a film-shaped support 11 in the stated order by vacuum deposition or sputtering, and similarly a first soft magnetic film layer 13, a second soft magnetic film layer 15, and a vertical magnetization film layer 17 are formed on the other side in the same manner. The first soft magnetic film layers 12 and 13 formed directly on the film-shaped support 11 are different in thickness from each other. Otherwise, the recording medium and the process for producing the recording medium are the same as in the first-described embodiment.

The reproduction output level has a peak value with respect to the thickness of the soft magnetic film layer. Therefore, the reproduction outputs from both sides of the recording medium can be made equal by setting the difference between the film layer thicknesses on opposite sides of the peak point. The peak value depends on the material composition and the manufacturing method; however, in general, it is between 2000 Å and about 7000 Å. For curl balance, the optimum difference between the film layer thicknesses depends on the type of the base layer (support), the pretreatment conditions, and the vacuum deposition or sputtering conditions; however, it is preferbly between 300 Å and 2000 Å.

On the other hand, it has been found that, in a vertical magnetization type recording medium having first and second soft magnetic film layers formed on each side of the support, if the first soft magnetic film layers on the two sides are made different in thickness from each other for purposes of curl balance, the latitude in the film-layer thickness difference is larger and the variations in characteristics of the recording media between lots are less when compared with the case where, in a vertical magnetization type recording medium having one soft magnetic film layer on each side thereof, the soft magnetic film layers on both sides thereof are made different in thickness from each other. The reason for this is not yet known.

The invention will be further described with reference to another Inventive Example and Comparison Example.

INVENTIVE EXAMPLE 2

A double-sided plural layer vertical magnetization type recording medium was manufactured by using a double-sided continuous sputtering apparatus as shown in FIG. 2 and employing the same process, up through the formation of the permalloy film layers, as in Inventive Example 1. The thickness of the permalloy film layers was about 2500 Å. The temperature of the cans 72 and 73 was 20° C. for the first running in the forward direction and 60° C. for running in the reverse direction.

The PET film, on both sides of which the permalloy film layers were formed as described above, was run in the forward direction again. At the can 72 (held at 120° C.), a Co-Cr film layer about 2500 Å thick was formed on the second permalloy film layer on the one side (surface 0) using the sputtering cathode 92. In succession, at the can 73 (held at the same temperature), another Co-Cr film layer about 2500 Å thick was formed on the second permalloy film layer on the other side (surface 1). The PET film thus treated was wound on the take-up shaft 74. The thickness of the first permalloy film set to 1400 Å, 1800 Å, 1900 Å and 2100 Å in the formation of four different recording media.

Figure 5:
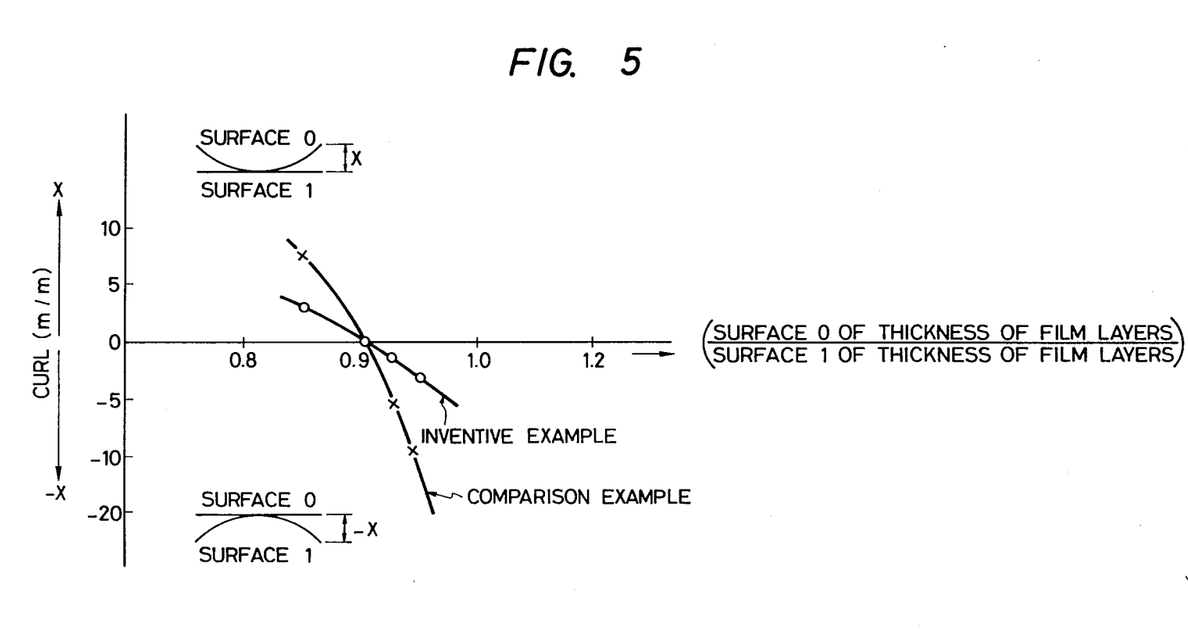
FIG. 5 is a graphical representation indicating the ratio in thickness of soft magnetic film layers on both sides of a support with the degree of curling.

5¼" floppy disks were formed by stamping the recording media this formed, and their curling conditions and electromagnetic conversion characteristics were measured. The results of measurement are as indicated in FIG. 5.

COMPARISON EXAMPLE 3

Vertical magnetization type recording media were manufactured using the same apparatus.

The sputtering chamber of the apparatus was evacuated to $1 \times 10^{-6}$ torr, and argon gas was introduced into the chamber until the pressure in it was held at about $3 \times 10^{-3}$ torr. Under this condition, the PET film was run from the supply shaft 71 at a rate of 40 mm/min. First, at the can 72 (held at a temperature of 60° C.), a permalloy film layer about 5000 Å thick was formed on the one side surface 0) of the PET film using the sputtering cathode 91. In succession, another permalloy film layer was formed on the other side (surface 1) using the sputtering cathode 93 at the can 73 (held at the same temperature). In this operation, the film thickness of the permalloy film layer was set to 3900 Å, 4300 Å, 4400 Å, 4600 Å in the formation of four different recording media. The PET film thus treated was wound on the take-up shaft 74.

The PET film thus covered with the permalloy film layers was run in the opposite direction. At the can 73 held at a predetermined temperature, a Co-Cr film layer was formed on the other side (surface 1) to a thickness of about 2500 Å using the sputtering cathode 94. At the can 72 (held at the same temperature), another Co-Cr film layer was formed on the one side (surface 0) to the same thickness (about 2500 Å) using the sputtering cathode 92. The PET film thus treated was wound on the supply shaft 71. In this operation, the temperature of the cans was set to 120° C.

The recording media thus manufactured were evaluated according to the same method as used in Inventive Example 2, and the results of evaluation are as indicated in FIG. 5.

It is apparent from FIG. 5 that, when the film thickness deviates from the best value, the recording medium of the invention curls less. However, the reproduction output of the recording medium of Inventive Example 2 was substantially equal to that of the recording medium of Comparison Example 3 in the vicinity of 0.9 on the horizontal axis.

Moreover, as before, recording media manufactured according to the method of the invention have substantially less variation in characteristics among lots, and about 90% of the recording media were found to be acceptable.

INVENTIVE EXAMPLE 3

Double-sided plural-layer vertical magnetization type recording media were formed using a double-sided continuous sputtering apparatus as shown in FIG. 2.

A roll of PET film 50 microns thick was set on the supply shaft 74 and the PET film was supplied through intermediate rollers 75 through 82 and cylindrical cans 73 and 72 to the take-up shaft 71 and wound thereon.

The sputtering chamber was evacuated to $1 \times 10^{-6}$ torr. Under this condition argon gas was introduced into the sputtering chamber in an amount so that the pressure therein was held at about $3 \times 10^{-3}$ torr. The PET film was supplied from the supply shaft 74 at a rate of 40 mm/min. At the can 73 (held at a temperature of 20° C.), a first permalloy film layer was formed on the other side (surface 1) of the PET film to a thickness of about 2500 Å using the sputtering cathode 93. In succession, at the can 72 held at the same temperature, another first permalloy film layer was formed on the one side of the PET film to a predetermined thickness (described below) using the sputtering cathode 91. The PET film thus threated was wound on the take-up shaft 71.

The PET film thus wound was run in the opposite direction from the take-up shaft 71. At the can 72 (held at a temperature of 120° C.), a second permalloy film layer 2500 Å thick was formed on the first permalloy film layer of the surface 0 using the sputtering cathode 91. A Co-Cr film layer 2500 Å thick was formed on the second permalloy film layer using the sputtering cathode 92. Furthermore, at the can 73 (held at the same temperature), another second permalloy film layer was formed on the first permalloy film layer of the surface 1 to a thickness of 2500 Å using the sputtering cathode 93, and in succession another Co-Cr film layer was formed on the second permalloy film layer of the surface 1. The PET film thus treated was wound on the winding shaft 71.

In this operation, the thickness of the first permalloy film layer of the surface 0 was set to 1400 Å, 1800 Å, 1900 Å, and 2100 Å in forming four different double-sided plural-layer vertical magnetization type recording media.

The double-sided plural-layer vertical magnetization type recording media manufacturing according to the method of the invention scarcely curled. Furthermore, in the recording media, the reproduction output characteristics of the two sides thereof were substantially identical, and the manufacturing tolerances are considerably wide.

INVENTIVE EXAMPLE 4

Double-sided plural-layer vertical magnetization type recording media were manufactured using a double-sided continuous sputtering apparatus as shown in FIG. 2 in the same manner as in the case of Inventive Example 2, except that the thickness of the first permalloy film layer on the other side (surface 1) of the PET film was set to 1800 Å, 1900 Å, 2100 Å, and 2500 Å, to form four different recording media.

Figure 6:
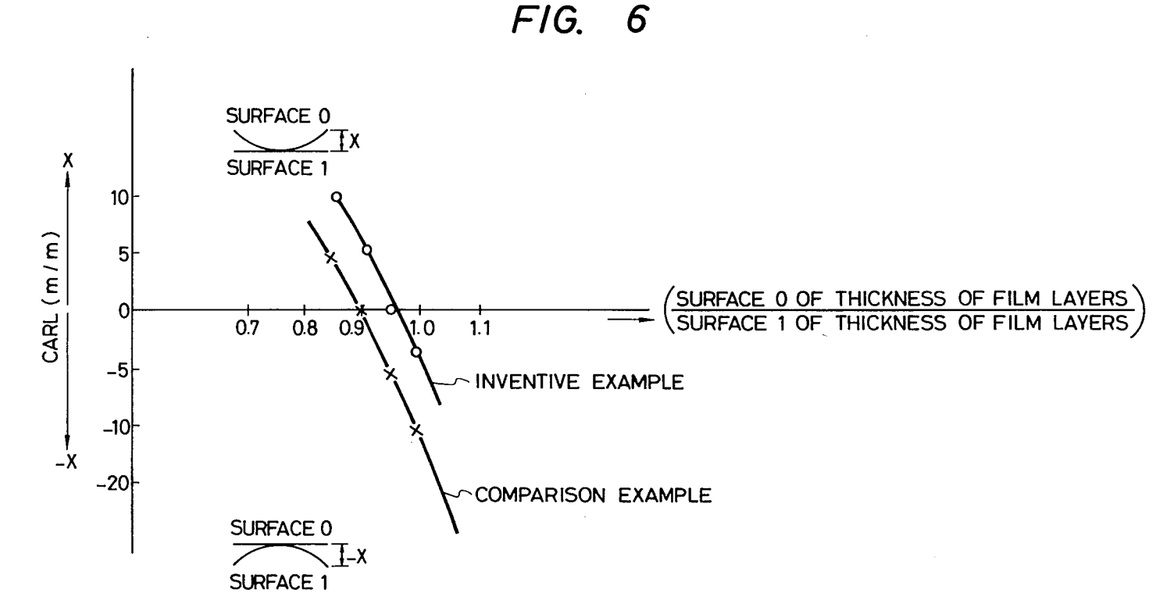
FIG. 6 is a graphical representation indicating the ratio in thickness of soft magnetic film layers on both sides of a support with the degree of curling.

5¼" floppy disks were formed by stamping the recording media thus formed, and their curling conditions and electromagnetic conversion characteristics were measured. The results of measurement are as indicated in FIG. 6.

COMPARISON EXAMPLE 4

Vertical mangetization type recording media were manufactured using the same apparatus as that employed for Inventive Example 4 described above.

The sputtering chamber of the apparatus was evacuated to $1 \times 10^{-6}$ torr, and then argon gas was introduced into the chamber through the gas introducing system 60 until the pressure in the chamber reached about $3 \times 10^{-3}$ torr. Under this condition, the PET film was run from the supply shaft 71 at a rate of 40 mm/mi. First, at the can 72 (held at a temperature of 60° C.), a permalloy film layer was formed on one side (surface 0) of the PET film to a thickness of about 5000 Å using the sputtering cathode 91. In succession, at the can 73 held at the same temperature, another permalloy film layer was formed on the other side of the PET film to a predetermined thickness (as described below) using the sputtering cathode 93. The thickness of the permalloy film layer on the other side of the PET film as set to 3900 Å, 4300 Å, 4400 Å, and 4600 Å in forming four different recording media. The PET film thus treated was wound on the take-up shaft 74.

The PET film thus covered with the permalloy film layers was run in the opposite direction. At the can 73 held at a predetermined temperature, a Co-Cr film layer was formed on the permalloy film layer of the other side (surface 1) to a thickness of about 2500 Å. In succession, at the can 72 held at the same temperature, another Co-Cr film layer was formed on the one side (surface 0) to a thickness of about 2500 Å. The PET film thus treated was wound on the supply shaft 71. In this operation, the temperature of the cans was set to 120° C.

The recording media thus manufactured were evaluated according to the same method as Inventive Example 4, and the results of evaluation are as indicated in FIG. 6.

FIG. 6 is a graphical representation indicating the degree of curling with the ratio of thickness of the film layers formed on both sides of the support. As is apparent from FIG. 6, under the condition that the degree of curling is close to zero, the film layer thickness ratio of Inventive Example 4 is closer to unity than that of Comparison Example 4. Thus, in the case where the first and second soft magnetic film layers are formed on each side of the support and the second soft magnetic film layers on both sides are made different in thickness from each other for curl balance, according to the invention, the difference in thickness therebetween can be small. Therefore, in accordance with the invention, even if the curl balance is determined as described above, the magnetic film layers on both sides of the recording medium are substantially equal in durability.

We claim:

1. The method of manufacturing a vertical magnetization type recording medium in which a soft magnetic film layer essentially containing Co-Cr is formed by vacuum deposition or sputtering on each side of a film-shaped support which is run along cylindrical cans, the improvement comprising the steps of: forming each said soft magnetic film layer by forming a first soft magnetic film layer on each side of said support with said cylindrical cans held at a temperature of 30 C or lower by vacuum deposition or sputtering, and a second soft magnetic film layer on said first soft magnetic film layer is formed with said cylindrical cans held at a temperature of 60 C or higher by vacuum deposition or sputtering, with the thickness of said first soft magnetic film layer on one side of said support being different from that of said first soft magnetic film layer on the other side of said support.

2. In a method for manufacturing a vertical magnetization type recording medium in which a soft magnetic film layer and a vertical magnetization film layer essentially containing Co-Cr are formed by vacuum deposition or sputtering on each side of a film-shaped-support run along cylindrical cans, the improvement comprising the steps of: forming first soft magnetic film layers on both sides of said support using soft magnetic film layer vacuum deposition or sputtering sources arranged around cylindrical cans held at a temperature of 30° C. or lower, and forming second soft magnetic film layers on said first soft magnetic film layers with said soft magnetic film layer vacuum deposition or sputtering sources held at a temperature of 60° C. or higher, and forming vertical magnetization film layers essentially containing Co-Cr on said second soft magnetic film layers.

3. The method for manufacturing a vertical magnetization type recording medium as claimed in claim 2, wherein the thickness of said second soft magnetic film layer is in a range of 20% to 500% of the thickness of said first soft magnetic film layer, and the total thickness of said first and second soft magnetic film layers is in a range of 0.1 to 5 microns.

4. The method for manufacturing a vertical magnetization type recording medium as claimed in claim 2, wherein the thickness of said vertical magnetization film layer is in a range of 0.03 to 5 microns.

5. The method for manufacturing a vertical magnetization type recording medium as claimed in claim 2, wherein the thickness of said vertical magnetization film layer is in a range of 0.05 to 1 micron.

6. The method for manufacturing a vertical magnetization type recording medium as claimed in claim 2, wherein said second soft magnetic film layers are formed at a temperature of 90° C. or higher.

7. The method for manufacturing a vertical magnetization type recording medium as claimed in claim 2, wherein said vertical magnetization film layer is formed at a temperature 90° C. or higher.

8. The method for manufacturing a vertical magnetization type recording medium as claimed in claim 2, wherein said vertical magnetization film layer is formed at a temperature of 120° C. or higher.

9. In a method for manufacturing a vertical magnetization type recording medium in which a soft magnetic film layer essentially containing Co-Cr is formed by vacuum deposition or sputtering on each side of a film-shaped support which is run along cylindrical cans, the improvement comprising the steps of: forming each said soft magnetic film layer by forming, in sequence, a first soft magnetic film layer on each side of said support having anisotropic static magnetic characteristics by vacuum deposition or sputtering and a second soft magnetic film layer on said first soft magnetic film layer by vacuum deposition or sputtering having substantially isotropic static magnetic characteristics, such that the resulting composite first and second soft magnetic film layers on each side of said support have isotropic static magnetic characteristics and wherein the thickness of said first soft magnetic film layer on one side of said support is different from that of said first soft magnetic film layer on the other side of said support.

10. The vertical magnetization type recording medium as claimed in claim 1, wherein a difference between the thickness of said first soft magnetic film layers is in a range of 2000 Å to 7000 Å.

11. The vertical magnetization type recording medium as claimed in claim 1, wherein a difference between the thicknesses of said first soft magnetic film layers is in a range of 300 Å to 2000 Å.

* * * * *